United States Patent [19]

Allen

[11] Patent Number: 5,325,192
[45] Date of Patent: Jun. 28, 1994

[54] AMBIENT LIGHT FILTER FOR INFRARED LINKED STEREOSCOPIC GLASSES

[75] Inventor: David W. Allen, Beaverton, Oreg.

[73] Assignee: Tektronix, Inc., Wilsonville, Oreg.

[21] Appl. No.: 919,814

[22] Filed: Jul. 24, 1992

[51] Int. Cl.$^5$ ............................................. H04N 13/04
[52] U.S. Cl. ..................... 348/51; 359/194; 348/55; 348/164
[58] Field of Search ............... 358/92, 88, 174, 113; 330/107, 294; 359/161, 194; 250/214 B; H04N 13/04

[56] References Cited

U.S. PATENT DOCUMENTS

| | | | |
|---|---|---|---|
| 3,621,127 | 2/1969 | Hope | 358/92 |
| 3,737,567 | 6/1973 | Kratomi | 178/6.5 |
| 3,805,178 | 4/1974 | Rollett | 330/107 |
| 3,906,232 | 9/1975 | Meihofer | 250/214 B |
| 4,115,006 | 9/1978 | Reymond et al. | 250/214 B |
| 4,128,760 | 12/1978 | Del Signore, II | 250/214 B |
| 4,156,134 | 5/1979 | Minner | 250/214 B |
| 4,205,276 | 5/1980 | Wright et al. | 330/294 |
| 4,424,529 | 1/1984 | Roese et al. | 358/88 |
| 4,562,463 | 12/1985 | Lipton | 358/88 |
| 4,698,668 | 10/1987 | Milgram | 358/92 |
| 4,719,507 | 1/1988 | Bos | 358/92 |
| 4,764,736 | 8/1988 | Usui et al. | 330/294 |
| 4,772,943 | 9/1988 | Nakagawa et al. | 358/92 |
| 4,772,944 | 9/1988 | Yoshimura | 358/92 |
| 4,851,681 | 6/1989 | DePauli | 330/294 |
| 4,884,876 | 12/1989 | Lipton et al. | 350/347 E |
| 4,907,860 | 3/1990 | Noble | 358/92 |
| 4,967,268 | 10/1990 | Lipton et al. | 358/92 |

*Primary Examiner*—Tommy P. Chin
*Assistant Examiner*—Richard Lee
*Attorney, Agent, or Firm*—John D. Winkelman; Richard B. Preiss

[57] ABSTRACT

A stereoscopic imaging system (10) includes a display (14) and stereoscopic glasses (18) having right-and left-eye pieces (20 and 22). A photodetector (28) in the glasses receives electromagnetic radiation including IR pulses, having fast rise times, from a transmitter (26), and noise from ambient light and other electromagnetic radiation. An ambient light filter (34) filters out low frequency and low amplitude noise created by ambient light and other electromagnetic signals. The ambient light filter employs a high pass filter cancellation loop (42) that cancels low frequency components, a high frequency amplifier (50) that provides unity gain to low frequency components, and a high pass filter (C3 and R9). The ambient light filter also employs a threshold adjusting circuit (64) that temporarily adjusts the threshold voltage of a comparator (60) in response to reception of the IR pulses.

6 Claims, 3 Drawing Sheets

AMBIENT LIGHT FILTER FOR INFRARED LINKED STEREOSCOPIC GLASSES

TECHNICAL FIELD

The present invention relates to an ambient light filter for infrared linked stereoscopic glasses.

BACKGROUND OF THE INVENTION

Stereoscopic imaging systems have been employed to give a three-dimensional appearance to field sequential images displayed on a video display screen. The three-dimensional appearance is created by active stereoscopic glasses that switch between opaque and transmissive optical states to alternately transmit to a viewer left-and right-eye views of a stereoscopic image is sequentially displayed on the screen. The viewer fuses the separate left- and right-eye images into a single stereoscopic image.

In certain prior stereoscopic imaging systems, the active stereoscopic glasses are linked to the video display with wires. This is undesirable, however, because the wires tether the viewer to the video display. To overcome this problem, other systems have used infrared radiation to link the stereoscopic glasses to the video display. For example, U.S. Pat. No. 4,967,268 of Lipton et al. ("Lipton et al. patent"), entitled "Liquid Crystal Shutter System for Stereoscopic and Other Applications," describes infrared linked active stereoscopic glasses.

A problem encountered with infrared linked systems is that the stereoscopic glasses may mistake electromagnetic noise for infrared pulses, or the electromagnetic noise may make differentiation of infrared pulses from noise unreliable.

There is a need, therefore, for an ambient light filter for infrared stereoscopic glasses.

SUMMARY OF THE INVENTION

An object of the present invention is, therefore, to provide an ambient light filter for infrared stereoscopic glasses.

A stereoscopic imaging system includes a display and stereoscopic glasses having right- and left-eye pieces. A photodetector in the glasses receives electromagnetic radiation including IR pulses, having very fast rise times, from a transmitter and noise from ambient light and other electromagnetic radiation. An ambient light filter filters out low frequency and low amplitude noise created by ambient light and other electromagnetic signals. The ambient light filter employs a high pass filter cancellation loop that cancels low frequency components, a high frequency amplifier that provides unity gain to low frequency components, and a high pass filter. The ambient light filter also employs a threshold adjusting circuit that temporarily adjusts the threshold voltage of a comparator in response to reception of the IR pulses.

Additional objects and advantages of the present invention will be apparent from the detailed description of preferred embodiments thereof, which proceeds with reference to the accompanying drawings.

DETAILED DESCRIPTION OF PREFERRED EMBODIMENT

Figure 1:
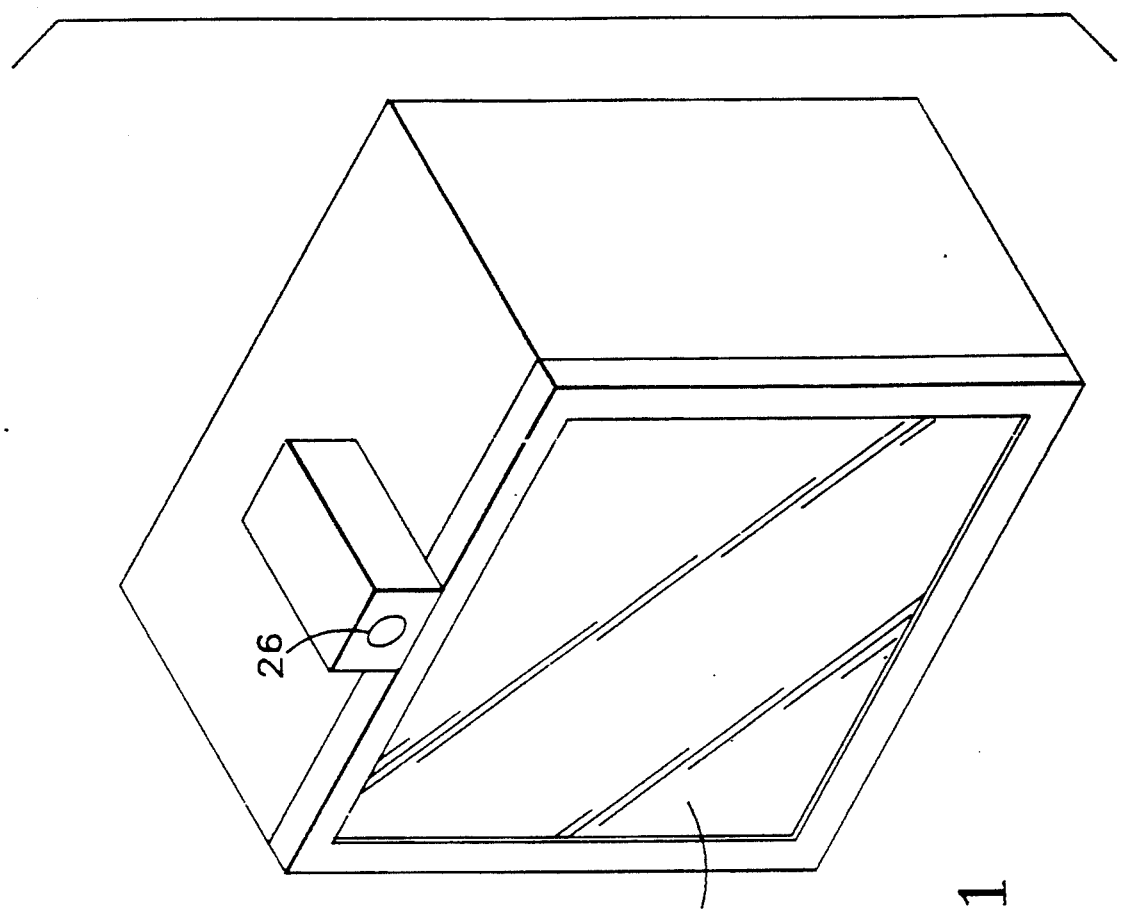
FIG. 1 shows a display and stereoscopic glasses according to the present invention.
Figure 1:
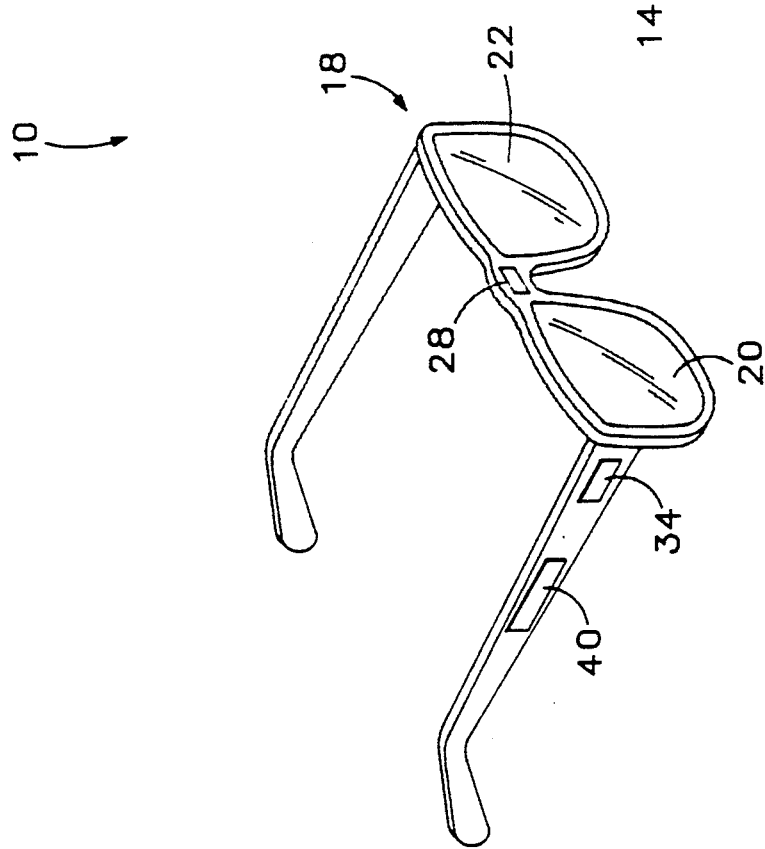

Referring to FIG. 1, a stereoscopic imaging system 10 includes a display 14 and stereoscopic glasses 18 having right- and left-eye pieces 20 and 22. Right- and left-eye pieces 20 and 22 may include light polarization state changers such as liquid crystal cells. A viewer (not shown) may view a field sequential stereoscopic image including right- and left-eye views on display 14 through right- and left-eye pieces 20 and 22. The fields are produced such that the image appears to be in three dimensions to the viewer when right-eye piece 20 is opaque and left-eye piece 22 is transmissive during, for example, even numbered fields, and left-eye piece 22 is opaque and right eye-piece 20 is transmissive during odd numbered fields.

A transmitter 26 transmits pulses of electromagnetic radiation. A preferred frequency of the electromagnetic radiation depends on the application of imaging system 10. For example, where there are multiple persons each viewing different screens, a preferred frequency may be in the infrared (IR) range. By contrast, where many persons are viewing a single screen, a preferred frequency may be in the radio frequency range. In the following description, however, it is assumed the electromagnetic frequency is in the IR range, and the electromagnetic pulses are referred to herein as IR pulses.

A photodetector 28 receives the IR pulses. Photodetector 28 produces an electric signal in response to receiving an IR pulse. As is explained below in connection with FIG. 2, an ambient light filter 34 filters out low frequency and low amplitude noise created by ambient light and other signals. Filter 34 delivers a signal representing the IR pulse to control circuitry 40, which controls the optical states of right- and left-eye pieces 20 and 22. Filter 34 may be located physically adjacent to control circuitry 40.

Different types of stereoscopic imaging systems employ different schemes for synchronizing the optical states of the right- and left-eye pieces 20 and 22. A pulse width modulation scheme is employed in the system of the Lipton et al. patent. Another scheme is described in a copending U.S. patent application for "Self-Synchronizing Optical State Controller for Infrared Linked Stereoscopic Glasses, " of Dennis W Prince, filed concurrently with the present patent application and owned by Tektronix, Inc., the assignee of the present patent application. In the scheme of Prince, an optical state controller controls the optical states of the right- and left-eye pieces based on the timing of a single IR pulse in a train of IR pulses. The present invention is not restricted to a particular scheme, but rather will improve the performance of a variety of schemes including those of Lipton et al. and Prince.

Figure 2:
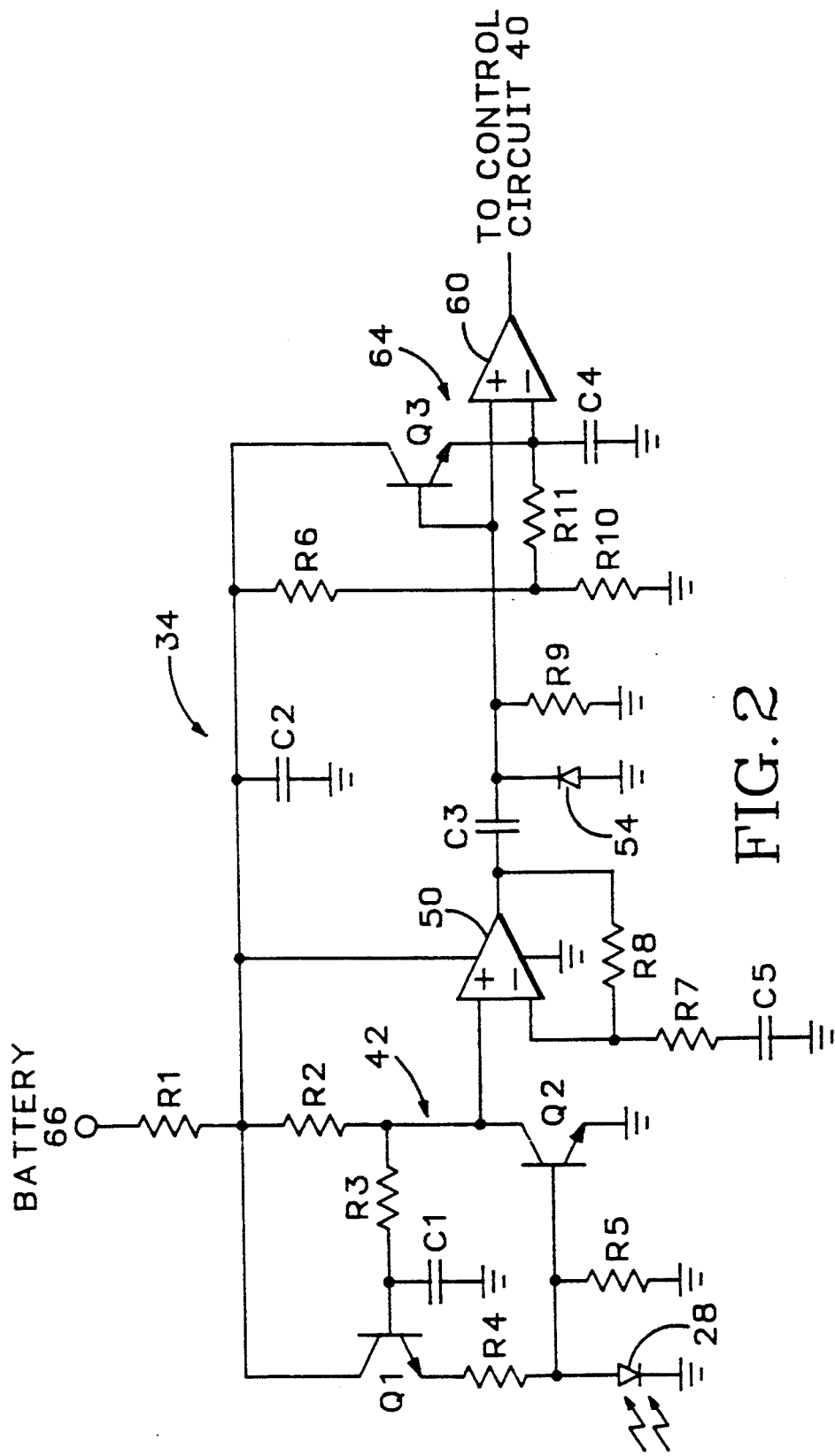
FIG. 2 shows a detailed circuit representation of the ambient light filter of the present invention.

FIG. 2 shows a schematic circuit representation of ambient light filter 34. Photodetector 28 detects electromagnetic energy that includes IR pulses from transmitter 26, and ambient electromagnetic noise from, for example, incandescent fluorescent lights and other lighting sources. Photodetector 28 may be a Motorola model MRD821 photodetector. A bias current established by NPN bi-polar junction transistors Q1 and Q2, and resistors R2, R3, and R4, flows through photodetector 28. Resistors R2, R3, and R4 may have resistance values of 1 kohm, 100 kohm, 100 kohm, and 4.75 kohm, respectively.

The IR pulses received by 28 have very high, e.g., 8 KHz, frequency components because of the fast rise times of the IR pulses. By contrast, ambient electromagnetic noise typically has frequency components in the range of 60 Hz to 120 Hz.

Photodetector 28 employs the photoelectric effect to create an electrical signal at the base of transistor Q2 in response to detected electromagnetic signals. A high pass filter cancellation loop 42 includes transistor Q2, resistor R3, capacitor C1, transistor Q1, and resistor R4. Cancellation loop 42 cancels out low frequency components as follows.

The signal at the base of transistor Q2 is inverted at the collector of transistor Q2. The collector of transistor Q2 is connected to the positive input of high pass amplifier 50 and to resistor R3. Resistor R3 and capacitor C1 form low pass filter passing signals of less than about 16 Hz. Capacitor C1 may have a capacitance value of 0.1 microfarad. Frequency components lower than 16 Hz of the signal at the collector of transistor Q2 are passed to the base of transistor Q1. Transistor Q1 acts as an emitter-follower and the low frequency components of the signal at the emitter of transistor Q1 are essentially equal to the low frequency components of the signal at the collector of transistor Q2. Therefore, the low frequency components of the signal at the emitter of transistor Q1 is essentially the inversion of the low frequency components of the signal at the base of transistor Q2. Consequently, the low frequency components of the signal at the base of transistor Q2 are cancelled by the low frequency components of the signal that pass around the cancellation loop 42.

Frequency components greater than 16 Hz of the signal at the collector of transistor Q2 are delivered to the positive input of high pass amplifier 50. Amplifier 50 may be a model 14575 marketed by Texas Instruments. The filter network of high pass amplifier 50 includes resistors R7 and R8 and capacitor C5. Resistors R7 and R8 may have resistance values of 22 kohms and 453 kohms, respectively, and capacitor C5 may have a capacitance value of 0.01 microfarads. Resistors R7 and capacitor C5 have a 220 microsecond time constant and form a 720 Hz high pass filter. High pass amplifier 50 provides unity gain for frequencies components significantly below 720 Hz and a gain of about twenty for frequency components significantly above 720 Hz.

The output of high pass amplifier 50 is connected to a high pass filter network comprising resistor R9 and capacitor C3, which has a time constant of 470 microseconds and forms a 340 Hz high pass filter. Resistor R9 may have a resistance value of 1 Mohm and capacitor C3 may have a capacitance value of 470 picofarads.

Figure 3:
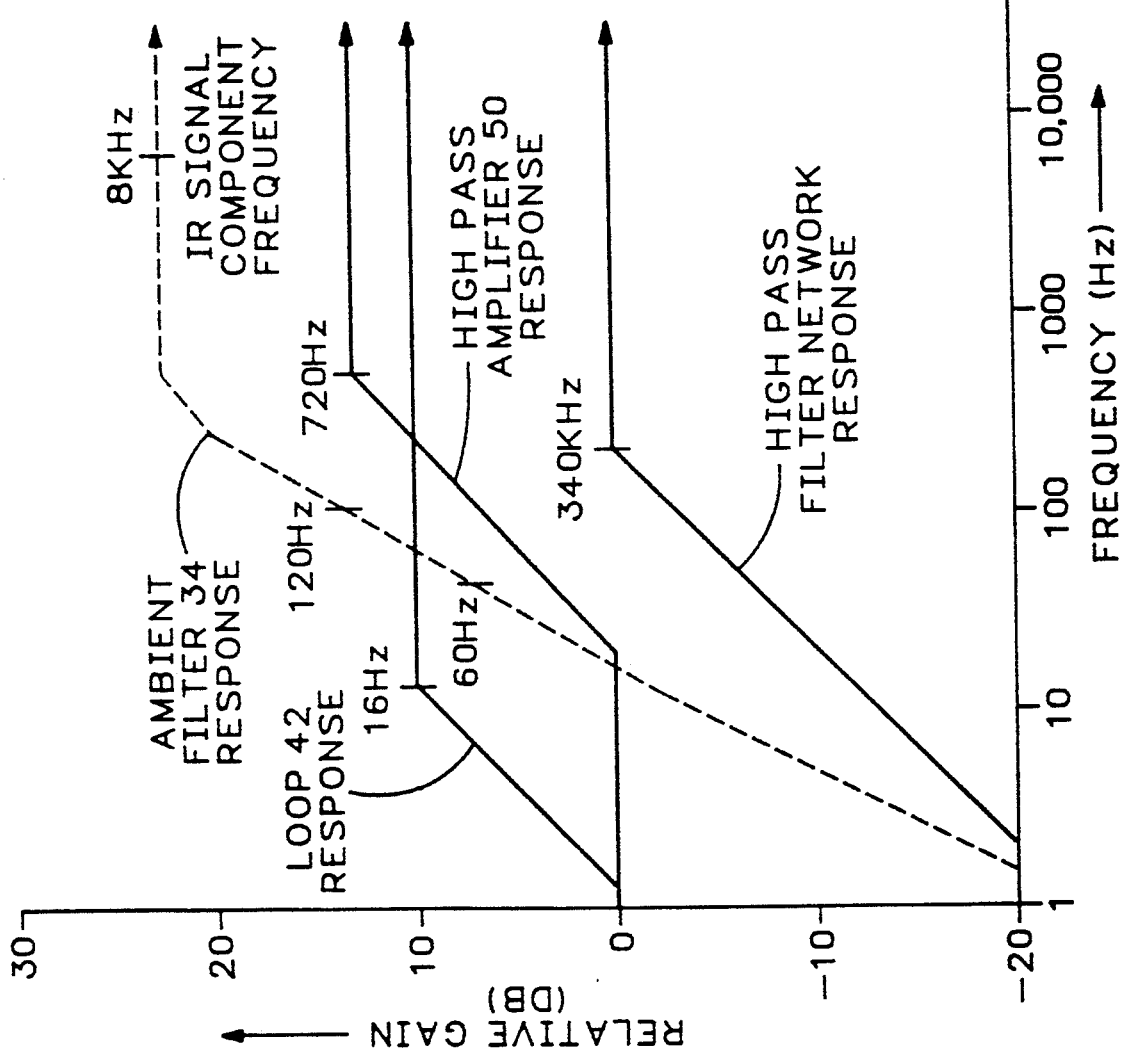
FIG. 3 graphically shows the overall and individual filter frequency response curves for the ambient light filter depicted in FIG. 2.

FIG. 3 shows the individual frequency response curves for high pass filter cancellation loop 42, high pass amplifier 50, and the high pass filter network formed by capacitor C3 and resistor R9, as depicted in ambient light filter 34 of FIG. 2. The overall amplitude versus frequency response curve of ambient light filter 34, as measured from photodetector 28 to the output of the high pass filter network, is shown in dashed lines. Ambient, filter, and infrared signal frequency components of interest are also indicated on FIG. 3.

Signals at the output of high pass amplifier 50 have a voltage offset of about 1.5 volts. In other words, when there is no electromagnetic signal at photodetector 28, the voltage at the output of amplifier 50 is about 1.5 volts. When an electromagnetic signal is received by photodetector 28 having frequency components and amplitude such that the resulting electrical signal is amplified by amplifier 50, the voltage at the output of amplifier 50 is between 1.5 and 5 volts, depending on the amplitude of the electromagnetic signal.

Capacitor C3 blocks DC voltage signals, but passes AC or transient voltage signals at the output of amplifier 50 to the positive input of comparator 60. Clamp diode 54 prevents AC voltage signals at the positive input of comparator 60 from having a negative voltage. Accordingly, all AC voltage signals at the positive input of comparator 60 have a positive voltage.

When no AC signal is present at the positive input of comparator 60 the voltage at the negative input of comparator 60 is biased at about 100 millivolts. The 100 millivolt value is set by battery 66, which provides 5 volts, resistors R1, R6, and R10, which may have resistance values of 1 kohm, 2 Mohms, and 47.5 kohm, respectively. Resistor R11 may have a resistance of 2 Mohm, and capacitor C2 and C4 may have a capacitance values of 1 microfarad and 0.1 microfarad, respectively. Capacitor C4 filters any high frequency components which may be present at the output of amplifier 50.

The signal at the positive input of comparator 60 is also applied to the base of NPN bipolar junction transistor Q3, which functions as a peak detector. The voltage of AC signals at the positive input of comparator 60 and the base of transistor Q3 range between 0 and 3.5 volts, depending on the strength of the signal received by photodetector 28. The voltage at the emitter of transistor Q3 equals the voltage at the base of transistor Q3 minus about 0.7 volts. A threshold adjusting circuit 64 includes transistor Q3 and capacitor C4. The voltage at the emitter of transistor Q3 is stored by capacitor C4 as a threshold adjusting voltage.

The peak detecting action of transistor Q3 automatically adjusts the threshold voltage at the negative input of comparator 60 in response to AC signals at the positive input of comparator 60. The threshold voltage is increased toward a maximum of about 2.8 volts or decreased toward a minimum of 100 millivolts depending on the amplitude of the signal at positive input of comparator 60. Capacitor C4 charges rapidly but discharges slowly in response to changes of voltage at the positive input of comparator 60. Because of cancellation loop 42, and the unity gain for low frequencies provided by high pass amplifier 50, it is anticipated that ambient noise signals will usually have voltages amplitudes of less than 100 millivolts.

If the voltage at the negative input of comparator 60 is 100 millivolts, a noise signal of over 100 millivolts could cause a 5 volt signal to be delivered from the output at comparator 60. Threshold adjustment circuit 64 reduces the chance of this happening by raising the threshold voltage at the negative input of comparator 60 in response to IR pulses. Capacitor C4 discharges back through R11 and R10 with a time constant of 200 milliseconds. Capacitor C4 should have a value that is reasonably long in comparison with the period of the IR pulse train.

It will be apparent to those having skill in the art that many changes may be made in the above-described details of the preferred embodiment of the present invention without departing from the underlying principles thereof. The scope of the invention should, therefore, be interpreted by the following claims.

I claim:

1. A filter system for use in a pair of electromagnetically-linked active stereoscopic glasses for use in a stereoscopic imaging system, the filter system comprising:
    an electromagnetic receiver that produces an electrical signal in response to receiving an electromagnetic signal;
    high pass filter cancellation loop means for providing negative feedback of low frequency components of the electrical signal;
    high frequency amplifier means for providing a low gain to low frequency ambient noise components and a high gain to high frequency components of the electrical signal, the high frequency amplifier means having an output signal that is AC coupled to a comparator means for comparing an amplitude of the output signal of the high frequency amplifier means to a threshold voltage; and
    threshold adjusting means for adjusting the threshold voltage of the comparator means in response to a peak amplitude of the output signal.

2. The filter system of claim 1 in which the electromagnetic signal is in the infrared range.

3. The filter of claim 1 in which the cancellation loop filter changes a bias current of a photodetector in the electromagnetic receiver in response to the low frequency components of the electrical signal.

4. A filter system for use in a pair of electromagnetically-linked active stereoscopic glasses for use in a stereoscopic imaging system, the filter system comprising:
    an electromagnetic receiver that produces an electrical signal in response to receiving an electromagnetic signal;
    high frequency amplifier means for providing a low gain to low frequency ambient noise components and a high gain to high frequency components of the electrical signal, the high frequency amplifier means having an output signal that is AC coupled to a comparator means for comparing an amplitude of the output signal of the high frequency amplifier means to a threshold voltage; and
    threshold adjusting means for adjusting the threshold voltage of the comparator means in response to a peak amplitude of the output signal.

5. The filter of claim 4 further comprising a high pass cancellation loop filter that provides negative feedback of the low frequency components of the electrical signal.

6. The filter of claim 5 in which the cancellation loop filter changes a bias current of a photodetector in the electromagnetic receiver in response to the low frequency components of the electrical signal.

* * * * *